July 6, 1943.  C. J. CRANE ET AL  2,323,311
AUTOMATIC ALTITUDE CONTROL
Filed July 31, 1940  2 Sheets-Sheet 1
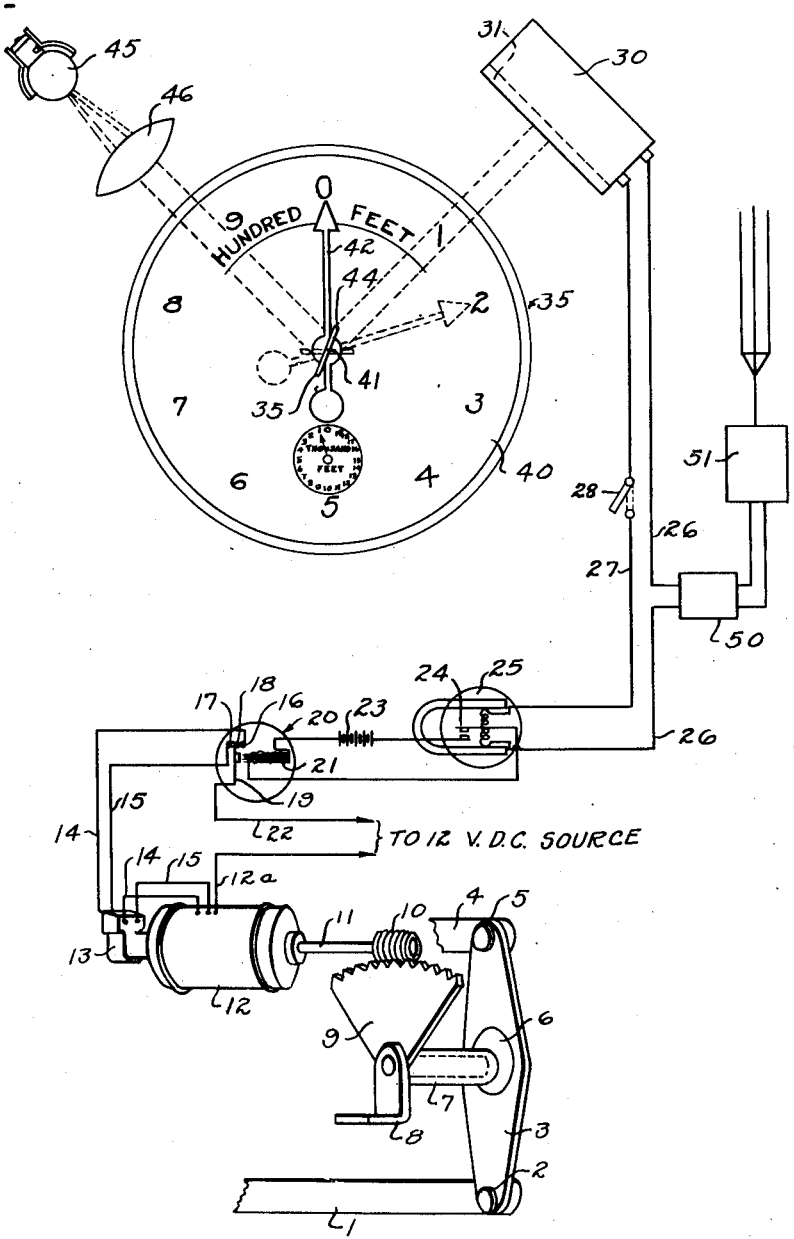
INVENTORS
CARL J. CRANE
RAYMOND K. STOUT July 6, 1943.   C. J. CRANE ET AL   2,323,311
AUTOMATIC ALTITUDE CONTROL
Filed July 31, 1940   2 Sheets-Sheet 2
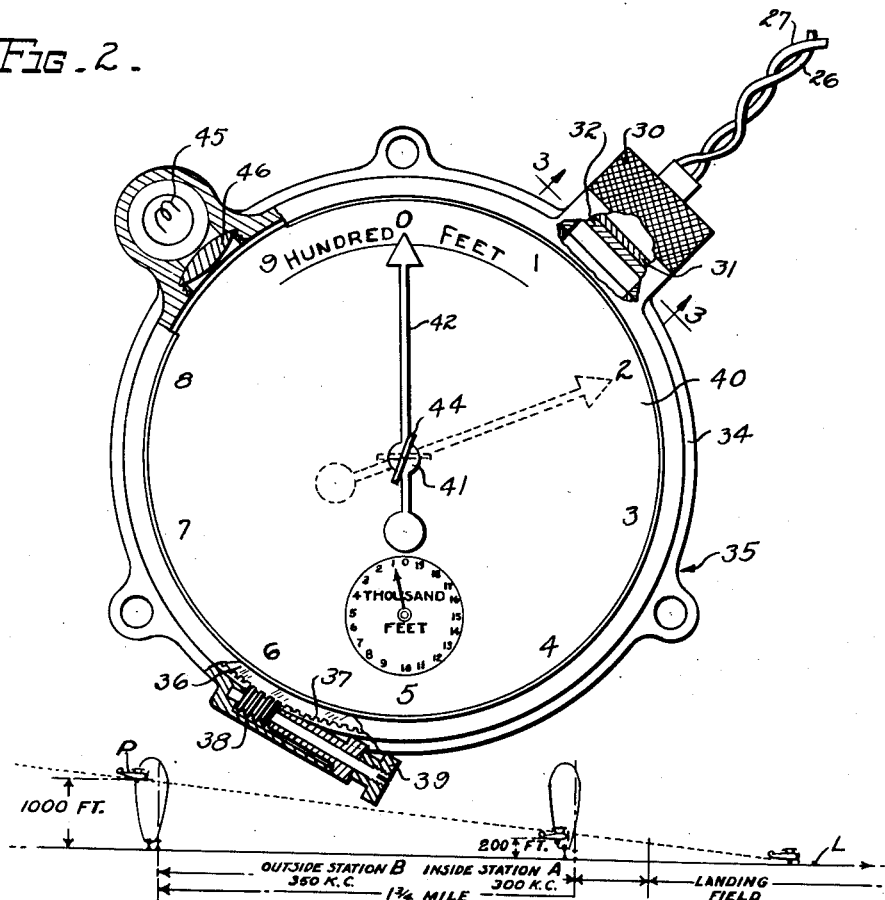
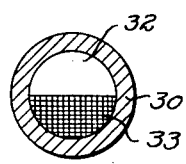
INVENTOR
CARL J. CRANE
RAYMOND K. STOUT Patented July 6, 1943

2,323,311

UNITED STATES PATENT OFFICE 2,323,311

AUTOMATIC ALTITUDE CONTROL

Carl J. Crane and Raymond K. Stout, Dayton, Ohio

Application July 31, 1940, Serial No. 348,719

3 Claims. (Cl. 244—77)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to means for limiting the descent of an aircraft to a predetermined altitude and more particularly to a device operative to maintain the altitude of an aircraft at a predetermined value under the control of a barometric device such as a sensitive altimeter which, upon the aircraft descending to a predetermined altitude, closes a relay circuit which controls an electric servomotor to vary the engine throttle setting to thereby maintain the altitude substantially constant at the predetermined value.

The instant device is of value in controlling the throttle of an aircraft engine during the descent of an airplane for an instrument landing in accordance with an improved form of the well-known Army Air Corps blind landing system. In this improved system, a descent is made in several stages along a course aligned with the landing runway and marked by a plurality of aligned, spaced, high frequency marker beacon transmitters. The flight of the aircraft is under automatic control both in the horizontal and vertical planes. It is essential that the descent from the last marker beacon station to the landing field be started from an altitude of approximately two hundred feet, depending of course on the particular aeroplane employed. In order to limit the descent to an altitude of such a value, it is also essential that the predetermined altitude be reached some time prior to passing over the last marker beacon station and that the altitude thereafter remain substantially constant until the said last marker beacon station is passed, at which time the altitude control is rendered inoperative and the final stage of the descent to a landing is begun. The descent from the point of the marker beacon station next preceding the last station is made at a constant rate from a higher predetermined altitude, such that the aircraft reaches the desired lower altitude of two hundred feet prior to passing the last marker beacon station. Immediately upon reaching the desired altitude of two hundred feet, or slightly prior thereto, the device according to the invention opens the aircraft engine throttle a sufficient amount to stop the descent and to maintain level flight at the selected altitude until the last marker beacon station is passed over, at which time the barometric pressure-responsive device becomes inoperative under the control of a relay actuated by the output of a marker beacon receiver which forms no part of the subject matter of the present invention. The throttle is again reduced to a point such that the final stage of descent is made at a constant rate until contact is made with the ground.

Devices responsive to barometric pressure for regulating an engine throttle control are old in the art, as is also the broad idea of regulating the altitude of an aircraft by control of the engine throttle, such apparatus being disclosed in the U. S. Patent No. 1,997,412, granted to Eduard Fischel. The Fischel patent discloses an electric servomotor for controlling the aircraft engine throttle, the operation of the servomotor being in turn intermittently controlled by a switch adapted to be contacted by an altimeter pointer. The switch contacts are adapted to be adjusted relative to the altimeter pointer such that a neutral or electrically dead contact will be aligned with the pointer at some preselected altitude. If the setting of the neutral contact is such that the selected altitude differs from the instant altitude, the servomotor will be energized to either open or close the engine throttle to cause the aircraft to ascend or descend until the predetermined altitude is reached. Various means are also disclosed adapted to vary the operation of the altimeter control to prevent overshooting and hunting at the selected altitude. The devices of Fischel are, however, not suited for use in the above-noted blind landing system since they continuously adjust the throttle during an ascent or descent, as distinguished from the instant device which allows the aircraft to descend at a constant rate and effect a control over the engine throttle only slightly prior to reaching the selected altitude. Since the difference in the throttle setting required to change from the descent to level flight, at a speed slightly above the stalling speed of the airplane, is only a small amount, the instant device is capable of making the necessary change in setting of the throttle without any appreciable overshooting of the desired altitude.

The device in accordance with the invention also incorporates the novel feature of energizing the throttle-setting servomotor by means of a photoelectric controlled relay, the photoelectric device being controlled by a sensitive altimeter. The use of a photoelectric device in conjunction with a sensitive altimeter renders it possible to effect an accurate control not possible in any device in which the altimeter itself is required to actuate the control switches, since any friction loading imposed on the altimeter introduces an error of as much as fifty feet in the response of the control. In actual flight tests with the device in accordance with the invention, it has been possible to maintain the preselected altitude constant within plus or minus ten feet due to the fact that the sensitive altimeter is not required to mechanically actuate any control element.

The principal object of the invention is the provision in combination with an aircraft power plant, of a sensitive barometric pressure-responsive device operative upon attaining a predetermined altitude for controlling the power output of the power plant to thereafter maintain the altitude substantially constant.

A further object of the invention is the provision in an aircraft power plant regulating means of a power means for regulating a power output control member, means for energizing said power means, a photoelectric device for controlling said last-named means and a sensitive altimeter for causing actuation of said photoelectric means upon the attainment of a predetermined altitude.

Another object of the invention is the provision in an apparatus of the character described of a novel means for controlling a switch by means of a sensitive altimeter through the medium of a photoelectric cell and a light source cooperating with said altimeter to control said switch.

Other objects of the invention not specifically enumerated above will become apparent by reference to the detailed description in the spcification and the appended drawings in which:

Figure 1 illustrates schematically an arrangement of the elements in accordance with the invention associated with an aircraft engine throttle-control element;

Figure 2 illustrates partly in section, the detail construction of the altimeter and photoelectric control device illustrated in Figure 1;

Figure 3 is a sectional view taken on line 3—3 of Figure 2, and

Figure 4 is a schematic view of the Army Air Corps blind landing system as used by an airplane equipped with the automatic altitude control device of the present convention.

Referring to Figure 1, the numeral 1 represents a throttle-control lever for controlling the throttle valve of an aircraft engine (not shown) and the lever is pivoted by means of a pivot 2 to the lower end of a floating lever 3, rotatably mounted on the eccentric 6. At its upper end, the lever 3 is pivoted to a manual control rod 4 by means of the pivot 5. The eccentric 6 is mounted on a shaft 7, rotatably supported in a bracket 8 and having the gear sector 9 rigidly secured thereto and rotatable therewith. As the gear sector 9 is rotated in either direction, the eccentric 6 will shift the lever 3 about the pivot 5, to thereby shift the throttle-control lever 1 to vary the power output of the associated engine. In any given position of the eccentric 6, however, the manual control rod 4 may be employed to independently shift the throttle-control lever 1. The manual control rod 4 is adapted, however, to be controlled by any suitable automatic device, if so desired. This floating lever throttle adjustment is old in the art and forms no part of the present invention.

The gear sector 9 meshes with a worm 10, mounted on the end of an armature shaft 11 of the reversible direct current electric motor 12. The electric motor 12 is provided with an armature conductor 12a, adapted to be connected to a suitable direct current source of power (not shown) and also has split field winding connections 14 and 15 which are connected through a limit switch device 13 of a conventional type. The limit switch 13 is adapted to break the field circuit of motor 12, upon the motor having made a predetermined number of revolutions either in the forward or reverse directions. From the limit switch device 13, the field conductor 14 is connected to a stationary contact 16 of a relay, generally indicated by the reference numeral 20. The field conductor 15 is similarly connected to a second stationary contact 17 of the relay 20. A double contact 18, on the end of a relay armature spring 19 of the relay 20, is adapted to be connected by means of a conductor 22 to the direct current supply source for the motor 12. The relay 20 is provided with a conventional solenoid coil 21 which is connected in series with an electric battery 23 and a pair of switch contacts 24, of a sensitive meter type of relay 25. The armature 19 of the relay 20 is normally yieldingly urged into a position such that contacts 17 and 18 are engaged, completing a circuit from the power supply through conductor 15 to armature conductor 12a of the motor 12, to thereby cause the motor 12 to rotate the gear sector 9 to adjust the throttle-control lever 1 in a position so as to reduce the power output of the engine to cause the airplane to descend in a power glide at a predetermined rate of descent. Upon the motor 12 having turned a predetermined number of revolutions, the limit switch 13 will interrupt the supply of power to the motor through the field conductor 15. Whenever relay coil 21 is energized, the contacts 16 and 18 will be in engagement, causing the motor 12 to rotate in the opposite direction until limit switch 13 interrupts the supply of power thereto, thereby advancing the throttle towards the open position a predetermined amount from its normal position, as determined by the previously mentioned setting due to the above-described action of the motor 12. The relay 25 is connected by means of conductors 26 and 27 to a sensitive photoelectric cell 30, which is preferably of the photronic type; i. e., it requires no external power source for the operation of the relay 25. The conductor 27 is provided with manually operated switch means 28. The photronic cell 30 is associated with a sensitive altimeter, generally indicated by the reference numeral 35, which has a pointer actuating shaft 41 for driving the indicating pointer 42, and a reflecting surface or mirror secured to the outer end thereof to rotate with the pointer 42. The mirror 44 is adapted to cooperate with a light source 45, which by means of a condensing lens 46 is adapted to project a beam of light onto the reflecting surface 44. As shown by the dotted lines in Figure 1, when the pointer 42 is opposite the two hundred foot indication mark on the dial 40 of the altimeter 35, the mirror 44 is in such a position, that the beam of light from the light source 45 will be directed onto the photronic cell 30, thereby causing the relay 25 to be energized to close the contacts 24 and to energize the motor 12. The conductor 26 of the photronic cell 30 has connected in series, therewith, a relay 50 adapted to be controlled by the output of a marker beacon radio receiver 51, so that the photronic cell 30 is rendered inoperative to control the motor 12 upon the relay 50 being actuated by marker beacon receiver 51. This control, however, forms no part of the present invention.

Referring to Figure 2, it will be seen that altimeter 35 comprises an external casing 34 and an internal casing 36 which contains the altimeter proper. The casing 36 is adapted to be rotatably mounted in the casing 34 by means not shown, and is provided with gear teeth 37, which mesh with a worm 38 mounted on the casing 34 and adapted to be rotated by turning the setting knob 39. The initial setting of the mirror 44 relative to the light source 45 can thereby be adjusted as desired. The light source 45 and the condensing lens 46 are each carried in a suitable housing formed integral with the casing 34, and in a similar manner, the photronic cell 30 is similarly supported from the casing 34. The photronic cell 30 comprises a cover glass 32 and a photosensitive element 31 placed behind the cover glass 32 and suitably electrically connected to the conductors 26 and 27.

As seen in Fig. 3, the cover glass 32 may be coated with an opaque material, as at 33, to thereby prevent light from passing through the cover glass until the light beam passes off of the mask area 33.

Operation

A conventional showing of an airdrome equipped for blind landing of aircraft is depicted in Figure 4, wherein the letter L indicates a point on the runway of the landing field and the letters A and B indicate "inner" and "outer" radio transmitting stations, respectively. These stations operate on different frequencies. The inner station A is located a predetermined distance from the end of the runway or from the point L, depending primarily upon the maximum possible gliding angle of the airplane and upon the nature and height of obstructions in the vicinity of the airdrome. The outer station B is at a fixed distance from the inner station A. The distance between stations A and B generally is not less than the distance required to lower the airplane from a predetermined altitude at the outer station B to a given altitude at the inner station A; the change in altitude being accomplished, while flying between the stations B and A along the landing path toward the point L, by properly reducing the forward speed of the airplane from a normal cruising speed at the outer station B to a gliding speed at the inner station A. In other words between stations B and A, the aircraft engine is throttled to obtain a speed slightly in excess of the stalling speed. Since the distance between the two stations is fixed, it is necessary that the airplane, when passing over the outer station B, be approximately at a predetermined altitude so that, in throttling the engine to obtain a speed slightly in excess of the stalling speed, the airplane cruising speed will be decelerated to slightly above the stalling speed when it reaches the inner station A. The speed of the airplane immediately prior to passing over station A and its altitude thereabove will depend largely upon the type of airplane.

Assuming an airplane P, equipped with the automatic altitude control device of the invention, to be in the process of making an instrument landing and approaching the outer station B which is to be passed over at an altitude of 1000 feet, the operation insofar as it involves the use of the automatic control device is as follows: The descent of the airplane to the predetermined altitude of 1000 feet may be initiated by suitable adjustment of the control rod 4 to obtain the required throttled setting, either manually by the pilot or automatically by any suitable automatic device (not shown) without regard to the automatic control device of the invention. In such a case, the switch 28 of the automatic altitude control device is opened to prevent energization of the relay 25. An alternative method of rendering the automatic altitude control device quiescent without opening the switch 28 would be to so operate the adjusting mechanism 37—39 as to position the photronic cell 30 beyond the contemplated range of deflection of the altimeter pointer 42. For example, when the pointer 42 is opposite the number 8 on the dial 40 with the altimeter reading at 1800 feet, and the photronic cell 30 is located between the numbers 8 and 0 on the dial, light from the source 45 impinging the mirror 44 will not be reflected to the cell 30 by the anti-clockwise deflection of the pointer from 8 to 0 resulting from the lowering of the altitude to 1000 feet. In the normal or quiescent condition of the automatic altitude control device, the relay 25 is always deenergized and the contact 18 is free of the contact 16 but in engagement with the contact 17. This condition is further characterized by the fact that the eccentric 6 is positioned at the limit of its throw in one direction by reason of the servomotor having completed the predetermined number of revolutions in the direction controlled by the circuit from the power supply through contacts 18 and 17 and conductors 15 and 12. The breaking of this circuit (which may be termed the throttle-closing circuit) without disturbing the relative engagement of contacts 17 and 18 is effected, as previously mentioned, by the limit switch device 13. In the quiescent condition of the automatic altitude control device, the eccentric 6 serves as a pivot or fulcrum about which the lever 3 is moved for varying the setting of the engine throttle, during manual or automatic operation of control rod 4. It is to be noted, also, that while the companion circuit to the servomotor through conductors 22 and 14 (which may be termed the throttle-opening circuit) is broken at the contact 16, there is no break in the circuit at this time at the point controlled by the limit switch device 13. Hence only the engagement of contact 18 with contact 16 is required to complete the circuit which controls the reversing of the servomotor.

With the automatic altitude control device in its quiescent condition and the airplane P headed for station B from a point beyond the station at an altitude over 1000 feet, the throttle setting is changed by operation of control rod 4 to decrease the power output of the engine sufficiently to lower the altitude of the airplane at a rate enabling it to pass over station B approximately at the desired altitude of 1000 feet. By suitable means, such as a signal light on the instrument panel operated by a marker beacon, the pilot is signalled when the airplane is directly over station B. At this time, the altimeter should read 1000 feet, as indicated by the full line construction of Figures 1 and 2. Upon receipt of the signal, the control rod 4 is operated to shift the floating lever 3 into a predetermined position about the eccentric 6 to effect, through the resultant movement of the throttle-control lever, a change in throttle setting. The throttle setting will now be such as decreases the power output of the aircraft engine to the proper value necessary to cause the airplane to descend in a power glide at a predetermined rate of descent enabling it to reach the desired lower altitude of 200 feet prior to passing over the inner station A. When the engine is thus throttled to obtain a speed slightly in excess of the stalling speed the cruising speed of the airplane will be decelerated to slightly above the stalling speed when it reaches station A. The automatic altitude control device is also conditioned at the start of the glide to limit the descent to the 200 ft. level. If the photronic cell 30 is beyond the contemplated range of deflection of the altimeter pointer 42, as is possible under the previously described alternate method of rendering the automatic altitude control device quiescent, the conditioning process consists merely in operating the adjusting mechanism 37—39 until the photronic cell 30 and the source of light 45 are positioned relatively to the dial 40 as shown in Figures 1 and 2. In the event that the cell and light source already have this setting, but with the switch 28 open, the automatic altitude control device is conditioned for operation simply by closing the switch. This conditioning process having been completed, the throttle setting remains constant during the descent of the airplane until the sensitive altimeter pointer 42 moving in a counter-clockwise direction with decreasing altitude, arrives substantially at the predetermined lower altitude indication, for example, the two hundred foot mark, as illustrated by the dotted line construction of Figures 1 and 2. During the deflection of the altimeter pointer, the mirror 44 continually changes its position relative to the light source 45 and no incident light is reflected therefrom to a point on the cell 30 above the mask 33 until the pointer 42 reaches the two hundred foot indication mark on the dial 40 of the altimeter, or slightly prior thereto.

When the beam of light impinges the light-sensitive element contained in the cell, the latter is energized and generates sufficient current to operate the sensitive electrical relay 25 which, in turn, operates the relay 20 to energize the relay coil 21 to attract the armature 19 to engage contact 18 thereof with contact 16. The engagement of contacts 16 and 18 closes the throttle-opening circuit to the electric motor 12; the latter being energized through conductors 22, 14 and 12a to cause immediate rotation of the worm 10 through the predetermined number of revolutions in the required direction necessary to move the eccentric 6 to a position at the limit of its throw in the opposite direction as distinguished from its position during the quiescent condition of the automatic altitude control device. By reason of this movement of the eccentric 6, the lever 3 is swung about the pivot 5 and shifts the throttle-control lever 1 in a throttle-opening direction until the eccentric is at the limit of its movement (which occurs when the limit switch 13 breaks the power supply of the motor through the field conductor 14), at which time the throttle setting is such as to increase the power output of the engine an amount to just sustain the airplane in horizontal flight or to cause the airplane to climb at a low rate. The throttle remains open throughout the deflection of the reflected light across the unmasked area of the cell 30 and, hence, the increased power output due to the open throttle is effective as a retarding and lifting force to stop the descent of the airplane and to cause it to ascend after a very slight overshooting of the 200 ft. mark. It will thus be seen that upon reaching the predetermined altitude of two hundred feet, the engine throttle will be continuously and quickly adjusted towards the wide open position to stop the descent of the airplane. The airplane will then begin to ascend from a level slightly below the 200 foot altitude until the altitude is slightly over 200 feet, at which time the photronic cell 30 will become deenergized, allowing the armature 19 to break engagement between contacts 16 and 18 and to restore engagement between contacts 17 and 18, causing motor 12, by reversing the position of eccentric 6, to return the engine throttle to its former power output reducing position. The airplane will then descend until the throttle is again opened as previously described. The movement of the eccentric 6 and, hence the change in throttle setting, from one predetermined limit to the other, occurs rapidly and there are no pauses between the predetermined limits. The airplane will tend to oscillate slightly above and below the predetermined altitude of 200 feet, due to the intermittent reversing of the throttle setting caused by the alternation of the motor 12. As only a small movement of the throttle is necessary at a speed slightly above stalling speed, to change from descent to level, this automatic altitude control device allows the airplane to descend along a straight glide which ensures that the aircraft will reach the desired lower altitude prior to passing to the last radio control station A, and quickly makes the necessary change in throttle setting to prevent more than a slight overshooting of the desired lower altitude. By careful design and due to the sensitive action of the photronic cell 30, it has been possible to maintain the predetermined altitude of two hundred feet within plus or minus ten feet, which for practical purposes may be considered as maintaining the altitude substantially constant at the preselected value. After passing over the last marker beacon station A, the altitude control, exerted by the photronic cell 30, may be discontinued either manually by opening the switch 28 or automatically by operation of the relay 50. The electric servomotor 12 will then restore the engine throttle to the glide position and the glide can thereafter continue at a constant rate of descent until contact is made with the ground.

The predetermined altitude necessary at the beginning of the last stage of the descent in an instrument landing will vary with various types of aircraft, and the value of this predetermined altitude may be adjusted within reasonable limits by means of the adjusting mechanism 37, 38 and 39 (Figure 2) previously described.

While a photronic type of photoelectric cell has been illustrated in the drawings, it is to be understood that any other type of light-sensitive cell may be employed, the photronic cell being used simply because it requires no external battery and generates sufficient current of itself to actuate a sensitive type of relay, thus greatly reducing the cost and weight of the installation.

Having now described our invention and the manner in which it is to be employed, what we claim to be new and desire to secure by Letters Patent is:

1. An automatic altitude control for aircraft comprising an aircraft power plant, an oscillatory member, servomotor means operable through predetermined circuit-controlled alternate cycles and connected with the oscillatory member to position the latter at the limit of its stroke in one direction when at the end of one cycle and to position the same at the limit of its stroke in the opposite direction when at the end of the other cycle, throttle-control means for varying the power output of the power plant and including a throttle-adjusting lever engaged by the oscillatory member to be shifted thereby for adjusting the throttle and movable relatively to the member to be independently adjustable in any given position of the member to vary the throttle setting, said lever having a predetermined throttle-setting position relative to the member which when the member is at the end of its stroke in a given direction effects a decrease in the power output of the power plant to cause the aircraft to descend in a power glide at a predetermined rate of descent and when the member is at the end of the stroke in the opposite direction effects an increase in the said power output, separate control circuits for the servomotor means having a common control switch normally and yieldably positioned in circuit-closing relation to the circuit controlling movement of the oscillatory member in the said given direction and in circuit-opening relation to the other circuit, normally inactive relay means energizable for reversing the position of the control switch to close said other circuit, and a barometric control for the relay, responsive to a predetermined barometric pressure to energize the relay.

2. In combination, an aircraft power plant having control means thereon for varying the power output of the power plant, a reversible servomotor operatively connected to said control means for actuating the same between predetermined limits, means for controlling the energizing of said servomotor, means operatively connected to said servomotor control means for biasing said control means to cause said servomotor to normally position said power output control means in a predetermined low output position corresponding to a predetermined uniform rate of descent of the aircraft, and barometric pressure responsive means associated with said servomotor control means operative upon descent of said aircraft below an altitude corresponding to a predetermined barometric pressure to actuate said servomotor control means in a reverse sense to position said power output control means in an increased power output position, to thereby stop the descent of the aircraft and to cause the same to ascend.

3. The structure as claimed in claim 2, in which the barometric pressure responsive means includes a sensitive altimeter having a shaft rotatable in accordance with variation in barometric pressure, a source of light, a photoelectric cell adapted to cooperate with said source of light, and a reflector carried by such altimeter shaft and rotatable therewith, said reflector being adapted to direct light from said source onto said photoelectric cell upon the attainment of said predetermined barometric pressure, a double acting relay forming said servomotor control means, said relay being normally biased in one direction to cause the servomotor to position the power output control means in the predetermined low power output position, and said relay being operatively connected to said photoelectric cell to be energized under the control thereof when the reflector directs light from said source onto said photoelectric cell, the energizing of said relay causing said servomotor to move the power output control to increase the power output of the aircraft power plant.

CARL J. CRANE.
RAYMOND K. STOUT.